United States Patent [19]

Cohen

[11] Patent Number: 4,606,957
[45] Date of Patent: Aug. 19, 1986

[54] PIPE INSULATION WITH FLAP FOR EXTREME WEATHER APPLICATIONS

[75] Inventor: Lewis S. Cohen, Hingham, Mass.

[73] Assignee: Venture Tape Corp., Rockland, Mass.

[21] Appl. No.: 688,870

[22] Filed: Jan. 4, 1985

[51] Int. Cl.⁴ .......................... F16L 59/02; B32B 3/06
[52] U.S. Cl. ...................................... 428/40; 428/77; 428/189; 428/194; 138/149; 138/151
[58] Field of Search ................... 428/40, 194, 189, 77; 138/149, 151

[56] References Cited

U.S. PATENT DOCUMENTS

| | | | |
|---|---|---|---|
| 4,022,248 | 5/1977 | Hepner et al. | 428/40 X |
| 4,028,474 | 6/1977 | Martin | 428/40 |
| 4,243,453 | 6/1981 | McClintock | 428/40 X |

*Primary Examiner*—Alexander S. Thomas
*Attorney, Agent, or Firm*—Wolf, Greenfield & Sacks

[57] ABSTRACT

An insulation system for pipes which includes a segment of insulation which is split along its length for application to the pipe, and which is sealed against itself around the pipe by a flap overlapping the slit and extending along the length of the segment. The inside surface of the flap is provided with a strip of pressure sensitive adhesive which extends to the outer edge of the flap and which seals the flap against the outer surface of the insulation segment. A release liner is provided in contact with the adhesive layer. The release liner extends from the outer edge of the flap inwardly to and beyond the inner edge of the strip of adhesive. The release liner overlies a non-adhesive strip adjacent the adhesive strip a distance sufficient to allow the release liner to be grasped by a gloved hand for removal thereof in extreme weather conditions.

8 Claims, 3 Drawing Figures

PIPE INSULATION WITH FLAP FOR EXTREME WEATHER APPLICATIONS

FIELD OF THE INVENTION

This invention relates generally to pipes and insulation therefor, and more particularly to sealing flaps for the insulation which can be applied in cold or hot weather.

BACKGROUND OF THE INVENTION

Pipes which are used in dwellings, in commercial buildings or in industrial plants and which carry steam for steam heat, hot water, cold water, chemicals or petroleum products and the like are generally provided with an exterior layer of insulation. Such pipes may be formed of copper, steel, aluminum, plastic, rubber or other like materials. This exterior layer of insulation frequently comprises jackets which are wrapped about the pipe. These jackets are generally applied in segments which abut one another. Each segment comprises a generally cylindrically shaped block of insulation having a centrally disposed, axially aligned channel adapted to receive the pipe. Each segment is slit along its axial length so that the pipe may pass through the split and reside within the central channel. An overlapping flap is used to draw the slit portion together and to seal it. Preferably, the outer edge of this flap is secured against the outer surface of the insulation segment to provide the desired seal.

During construction of a building, the pipes are often exposed to great extremes of temperature, ranging from far below 0° F. to above 100° F. Such temperature extremes may also be experienced by the pipe after installation during times that repairs are required. Under such repair or construction conditions, the workers must apply the insulation while wearing gloves or other protective materials. It is generally very difficult for the workers to grasp the release liner which normally covers the adhesive on the flap of the insulation segment to remove it for sealing of the flap. In addition, with known release liners, the adhesive is sufficiently tacky to make separation of the liner from the adhesive very difficult, and this is especially true when the worker is wearing gloves or other protective materials. As a result, a great deal of time is lost during construction or repair while the worker attempts to remove the release liner during the application of the insulation. Such lost time greatly increases the cost of the construction and reduces the amount of work that can be done under extreme weather conditions.

SUMMARY OF THE INVENTION

An object of this invention is to provide an insulation system for pipes which can be applied at either very cold or very warm temperatures when using gloves or other protective materials.

Another object of this invention is to provide a flap for use in conjunction with a pipe insulation system which has a release liner which can be easily removed in either extremely cold or extremely warm temperatures by a worker wearing gloves or other protective materials on his hands.

The foregoing and other objects of this invention are achieved by a pipe insulation system which includes slit segments of insulation which are adapted to be wrapped about the pipe, and a flap disposed on each segment for sealing the slit of the segment, and for sealing the pipe within the segment. Each flap is provided with a strip of adhesive which extends to its outer edge. Prior to installation, disposed on top of each adhesive strip is a release liner adapted to be removed to expose the adhesive strip for sealing the flap. This adhesive strip is somewhat narrower than the release liner, so that the inner portion of the release liner is not adhered to the adhesive but overlies a non-adhesive strip. This inner portion of the release liner is not bonded to the flap and can be easily grasped by a worker wearing gloves or other protective material for removal of the release liner in cold or hot weather. In a preferred embodiment, the width of the adhesive strip is about 1.25 inches, the width of the adhesive free strip is about 0.25 inches, and the width of the release liner is about 1.5 inches.

The insulation segments typically comprise a layer of fiberglass or other insulation material surrounded by a laminate. The laminate is comprised of a fiberglass scrim having a paper layer disposed on one side thereof and secured by a laminating adhesive, and a metallized layer disposed on the other side thereof and secured by a laminating adhesive. The paper layer is on the outside of the segment, while the metallized layer faces inwardly toward the insulation. The flap usually is an extension of this laminate, and has the adhesive strip disposed on the inwardly facing, metallized layer. The pressure sensitive adhesive is typically an isooctyl acrylate polymer which has no fillers and is pure except for a standard cross-linker. This adhesive remains tacky at temperatures ranging from $-17°$ F. to $+150°$ F.

BRIEF DESCRIPTION OF THE DRAWINGS

The object, advantages and features of this invention will be more clearly appreciated from the following detailed description when taken in conjuction with the accompanying drawings in which.

DETAILED DESCRIPTION OF THE PREFERRED EMBODIMENTS

Figure 1:
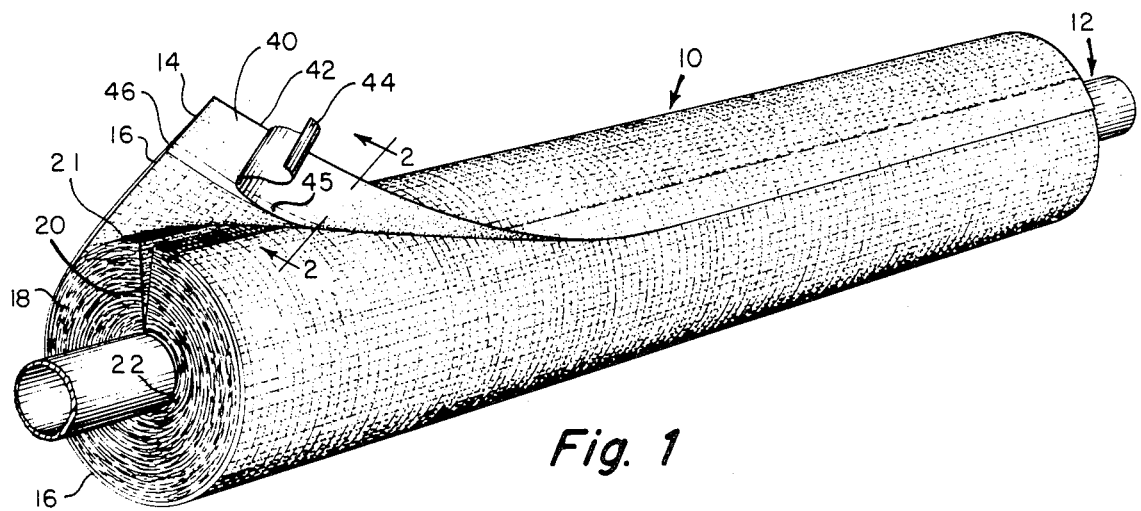
FIG. 1 is a pictorial view of an insulation segment of this invention in conjunction with a pipe.

With reference now to the drawings, and more particularly to FIG. 1 thereof, the insulation system of this invention will be described. FIG. 1 shows a typical insulation segment 10 about to be installed for insulating a pipe 12. Pipe 12 may be any conventional hot or cold water pipe or steam pipe or pipe for carrying chemicals or petroleum products used in a building, whether a commercial building or a dwelling or an industrial plant. Pipe 12 may be formed of any conventional material, such as copper, steel, plastic, aluminum or rubber.

In use, typically a plurality of segments 10 are provided in abutting, end to end relation to insulate the pipe along its length and to seal pipe 12 against the elements. Segment 10 is an exemplary one of such segments. Segment 10 is typically cylindrical in shape and is provided with a central channel 22 usually having a circular cross section and which extends through the center thereof in an axial direction. Typically, channel 22 has about the same cross sectional dimension as pipe 12 about which segment 10 is to be wrapped. Segment 10 is provided with a radial slit 20 which extends axially along the entire length of segment 10. Slit 20 is disposed on one side of segment 10 and allows segment 10 to be separated therealong for insertion of pipe 12 in channel 22. After insertion of pipe 12, the natural resiliency of the material of segment 10 urges the spaced opposite sides of slit 20 together.

Figure 2:
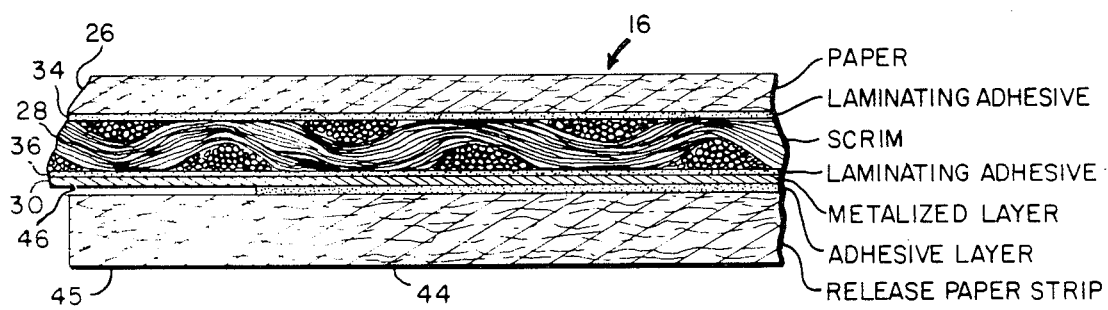
FIG. 2 is a cross-sectional view taken along the line 2—2 of FIG. 1.
Figure 3:
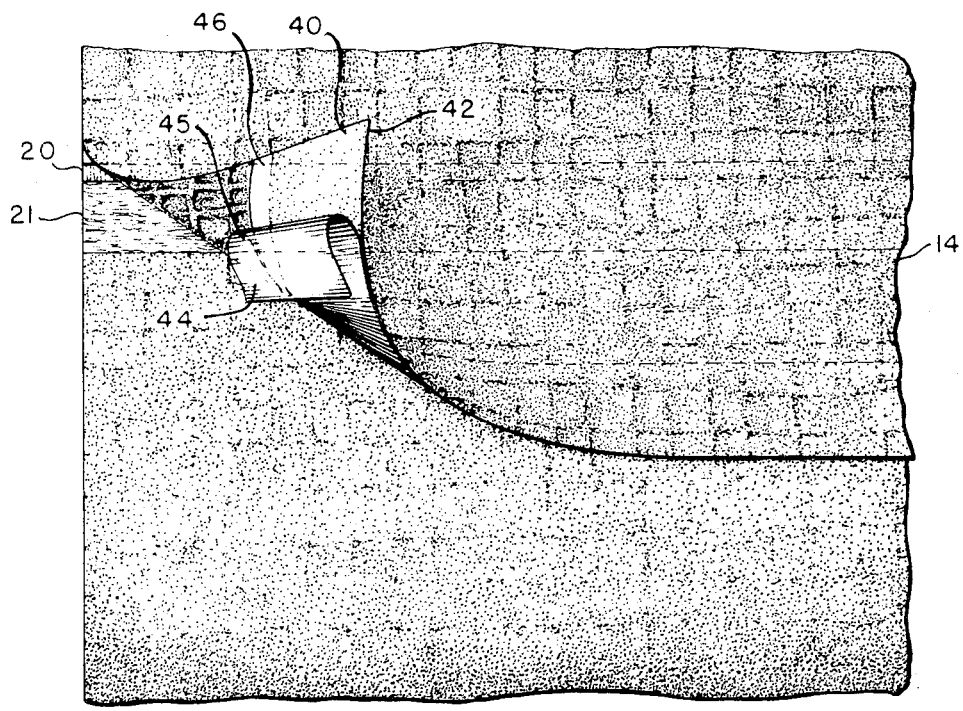
FIG. 3 is a partially cutaway plan view of the flap of FIG. 1.

Segment 10 comprises an outer layer 16 secured to an inner layer 18 by a conventional laminating adhesive. Layer 18 typically is comprised of woven fiberglass yarns, but can also be comprised of mineral wool, foamed fiberglass, urethane foam, or other known insulating materials. The composition of layer 16 is more clearly shown in FIG. 2. Layer 16 is a laminate, of which the outer layer is a flame retardant paper layer 26, and the inner layer is a metallized layer 30. Disposed between paper layer 26 and metallized layer 30 is a layer 28 of fiberglass scrim yarns. Layer 28 is secured to layer 26 by conventional laminating adhesive 34, and to metallized layer 30 by a conventional laminating adhesive 36. The adhesive which secures layer 18 to layer 16 is disposed on the outer surface of metallized layer 30. Typically, flame-retardant laminating adhesives are used for all adhesives, including adhesives 34 and 36. In one embodiment metallized layer 30 is a layer of aluminum foil with a thickness in the range of 0.00035 to 0.0007 inches. In another embodiment, metallized layer 30 is an aluminized polyester film of about ½ mil. thickness. In a preferred embodiment, layer 26 is a high intensity, white, chemically treated kraft-paper and the weight of the paper is on the order of 45 pounds per 3000 square feet. In a preferred embodiment, layer 28 is a tri-dimensional 5×5 fiberglass scrim.

Segment 10 includes a flap 14 which is disposed along and overlies slit 20. Flap 14 is an extension of layer 16 extending from one side of slit 20. Layer 16 typically terminates at a point spaced from slit 20 on the other side thereof from flap 14. Also, flap 14 is adhered to layer 18 only up to a point spaced from slit 20, so that a circumferential strip 21 of layer 18 is exposed on either side of slit 20 along its length. Flap 14 is sufficiently wide so that it overlaps exposed strip 21 of fiberglass layer 18. In this manner, if flap 14 is secured against the outer surface of layer 16, it completely covers exposed strip 21.

Disposed on the outer edge of flap 14 is a strip 40 of pressure sensitive adhesive. Strip 40 extends right to edge 42 of flap 14. Prior to installation, a release liner 44 covers adhesive strip 40. Adjacent adhesive strip 40 is a non-adhesive strip 46. Release liner 44 has a width greater than that of strip 40 so that one edge of liner 44 is immediately adjacent edge 42 of flap 14, while another portion 45 of release liner 44 overlies non-adhesive strip 46. Portion 45 of release liner 44 overlies non-adhesive strip 46 a distance sufficiently great so that a person wearing gloves or other protective material can grasp release portion 45 of liner 44 for removal of liner 44 from adhesive strip 40. In a typical application, adhesive strip 40 has a width of about 1.25 inches, while release liner 44 has a width of about 1.5 inches, so that portion 45 of release liner 44 overlies non-adhesive strip 46 a distance of about 0.25 inches. These dimensions may vary depending upon the width of the release liner available and upon other factors. After the removal of release liner 44, adhesive strip 40 of flap 14 is pressed against the outer surface of layer 16 to pull slit 20 together, and to seal slit 20, strip 21 and pipe 12. Flap 14 should be secured at edge 42 to prevent flap 14 from being easily or accidentally removed once it has been secured, to avoid destruction of the permanent seal about pipe 12.

A commercially available, acceptable material which comprises layer 16 can be purchased from Lamtec Corporation, Bartley-Chester Road, Post Office Box 37, Flanders, N.J. 07836 under the product designation 70J All Service Jacketing. Another commercially available, acceptable material can be purchased from Alpha Associates, Inc., 2 Amboy Avenue, Post Office Box 128, Woodbridge, N.J. 07095 under the product designation Alpha-Temp, Style ASJ/MAR. Another acceptable commerically available material can be purchased from Manville Building Materials Corporation, Ken-Caryl Ranch, Post Office Box 5108, Denver, Colo. 80217 under the product designation Foil Scrim Kraft ASJ.

Preferably, the pressure sensitive adhesive used in strip 40 is a pressure sensitive acrylic adhesive, typically an isooctyl acrylate polymer. This adhesive may be the same as that disclosed in my co-pending application, Ser. No. 658,120 filed on Oct. 5, 1984. The adhesive used in strip 40, has no fillers, except a conventional cross-linker. When cured, adhesive strip 40 approaches a 100% acrylate compound in which almost all solvents have been eliminated. However, strip 40 can tolerate up to 0.5% of solvents after curing and still perform as desired. When cured, strip 40 typically has a thickness of between 1.5 and 2 mils., and a coating weight of about 1.27 dry ounces per square yard. The specific gravity of the adhesive in strip 40 is about 0.92, and the William Plasticity is about 2.6.

One acceptable, commercially available form of the adhesive found in strip 40 may be purchased from National Starch And Chemical Corporation, Finderne Avenue, Bridgewater, N.J. 08807 under the trademark DURO-TAK, with the product designation 80-1058. When purchased commercially, this adhesive contains 38%, by weight, of solids with a viscosity of 7,000 CPS. The solvent system of this commercially available adhesive includes 55% ethyl acetate, 17% heptane, 26% isopropyl alcohol, and 2% toluene.

In use, segment 10 is pried apart at slit 20, and pipe 12 is passed through slit 20 until it resides within channel 22. Thereafter, flap 14 is pulled tightly across slit 20 to draw slit 20 into a closed position. Release liner 44 is removed by grasping portion 45 and by pulling on release liner 44 until it is completely separated from adhesive strip 40. Flap 14 is then sealed tightly against layer 16 at a position spaced from exposed strip 21 of fiberglass layer 18 to completely seal slit 20.

Because a non-adhesive strip 46 is provided adjacent adhesive strip 40, and since portion 45 of release liner 44 overlies non-adhesive strip 46 sufficiently to permit grasping thereof by a gloved hand, or a hand having other protection, segment 10 can be applied and used in extreme weather or operating conditions, whether they be very cold or very hot. Considerable construction time and money is saved. In addition the seal of segment 10 about pipe 12 is in no way compromised.

Modifications and improvements will occur within the scope of this invention to those skilled in the art, and the above description is intended as exemplary only. The scope of this invention is defined only by the following claims and their equivalents.

What is claimed is:

1. An insulation system for a pipe comprising:
    an elongated segment of insulation for being wrapped about a pipe, said segment having a radial slit therein extending along the entire length of said segment in the direction of elongation of said segment, said slit being adapted for insertion of a pipe therethrough; and means for sealing said slit, said sealing means comprising:
- a flap secured to said segment and extending across the width of said slit;
- a strip of adhesive on an inside surface of said flap extending generally along the length of said flap in a direction generally parallel to be direction of elongation of said segment, one side of said adhesive strip extending generally to an edge of said flap transverse of the direction of elongation of said segment;
- a non-adhesive strip disposed on said inside surface of said flap immediately adjacent said adhesive strip on the other transverse side thereof; and
- a removable release liner secured to said adhesive strip, said release liner having a portion overlapping said non-adhesive strip in unsecured relation thereto and adapted to be grasped for removal thereof, said overlapping portion of said release liner being disposed in a normally protected location between said flap and said segment prior to removal of said release liner.

2. An insulation system as recited in claim 1 wherein said overlapping portion of said release liner overlies said non-adhesive strip a distance sufficient to allow a worker wearing a glove to grasp said portion for removal of said liner.

3. An insulation system as recited in claim 2 wherein said adhesive strip has a width of about 1.25 inches, and wherein said overlapping portion of said release liner has a width of about 0.25 inches.

4. An insulation system as recited in claim 1 wherein said insulation segment comprises an inner layer of an insulating material, and an outer layer, said outer layer being a laminate of paper, fiberglass scrim and a metallized layer.

5. An insulation system as recited in claim 4 wherein said flap comprises an extension of said outer layer.

6. An insulation system as recited in claim 1 wherein said adhesive strip comprises a layer of pressure sensitive isooctyl acrylate adhesive being approximately a 100% arcylate compound and having a solvent content no greater than 0.5%.

7. A flap disposed on a segment of pipe insulation for sealingly covering a radial slit in the insulation extending along the length thereof, said flap comprising:
- a strip of pressure sensitive adhesive on an inside surface of said flap and extending to an outside, transverse edge of said flap;
- a non-adhesive strip disposed on said inside surface of said flap immediately adjacent said adhesive strip on the other side of said adhesive strip from said outside edge of said flap; and
- a release liner removably covering said adhesive strip, said release liner having a portion overlapping said non-adhesive strip in unsecured relation therewith a distance sufficient to allow grasping thereof by a gloved hand, said overlapping portion of said release liner being disposed in a normally protected location between said flap and a portion of the segment of pipe insulation prior to removal of said release liner.

8. A segment of pipe insulation having a radial slit extending the length of the segment through which a pipe can be inserted, said segment having a flap for sealing said slit and a pipe within the segment, said flap comprising:
- an outer layer of flame-retardant paper;
- a middle layer of a woven fiberglass scrim adhesively secured to an inner surface of said outer paper layer;
- an inner metallized layer adhesively secured to said middle layer;
- a strip of a pressure sensitive adhesive disposed on an inner surface of said metallized layer immediately adjacent a transverse outer edge of said flap;
- a non-adhesive strip disposed immediately adjacent said adhesive strip on a side thereof spaced from said outer edge of said flap; and
- a release liner removably secured to said adhesive strip, said release liner having a portion overlapping said non-adhesive strip to allow grasping of said portion for removal of said liner to expose said adhesive strip to secure said flap to said segment, said overlapping portion of said release liner having a width of approximately 0.25 inches, said overlapping portion of said release liner being disposed in a normally protected location between said flap and a portion of said segment porior to removal of said release liner.

* * * * *